United States Patent [19]
Sultan et al.

[11] Patent Number: 5,263,380
[45] Date of Patent: Nov. 23, 1993

[54] DIFFERENTIAL AC ANEMOMETER

[75] Inventors: Michel F. Sultan; Charles R. Harrington, both of Troy; John W. Hile, Lake Orion, all of Mich.

[73] Assignee: General Motors Corporation, Detroit, Mich.

[21] Appl. No.: 836,678

[22] Filed: Feb. 18, 1992

[51] Int. Cl.$^5$ ............................ G01F 1/68; G01P 5/10
[52] U.S. Cl. ............................ 73/204.26; 73/861.95; 73/204.25
[58] Field of Search ........... 73/204.25, 240.26, 204.23, 73/204.24, 204.16, 861.95

[56] References Cited
U.S. PATENT DOCUMENTS

| | | | |
|---|---|---|---|
| 4,332,157 | 6/1982 | Zemel et al. | 73/204.23 |
| 4,448,070 | 5/1984 | Ohyama et al. | 73/204.26 |
| 4,561,303 | 12/1985 | McCarthy | 73/204 |
| 4,576,050 | 3/1986 | Lambert | 73/861.05 |
| 4,651,564 | 3/1987 | Johnson et al. | 73/204 |
| 4,685,331 | 8/1987 | Renken et al. | 73/204.26 |
| 4,713,970 | 12/1987 | Lambert | 73/861.05 |
| 4,777,820 | 10/1988 | Hecht et al. | 73/204.26 |
| 4,782,707 | 11/1988 | Harrington et al. | 73/861.05 |
| 4,843,445 | 6/1989 | Stemme | 73/204.26 |
| 4,888,988 | 12/1989 | Lee et al. | 73/204.26 |
| 5,086,650 | 2/1992 | Harrington et al. | 73/204.21 |

OTHER PUBLICATIONS

*A Hot Wire Air Flow Meter for Intake Air Flow Measurement*, Y. Nishimura et al. (Hitachi Ltd.) SAE #890301.
*Hot Wire Air Flow Meter for Engine Control Systems*, K. Takahashi et al. (Hitachi Ltd.) SAE #900258.
*A Micromachined Silicon Mass Air Flow Sensor*, C. H. Stephan & M. Zanini (Ford Motor Co.) SAE #920473.
*How Micro Switch's New Kind of Air-Flow Sensor Does It*, Electronics; pp. 85–86; Oct. 1987.
*A Problem in Heat Conduction*, Journal of Applied Physics, vol. 22, #5; pp. 581–585 May 1951.

Primary Examiner—Michael T. Razavi
Assistant Examiner—Timothy J. May
Attorney, Agent, or Firm—Anthony Luke Simon

[57] ABSTRACT

An apparatus comprises a sensor including a heater, an upstream detector and a downstream detector. An AC signal source excites the heater to generate propagating heat signals that are received by the upstream and downstream detectors. A first detecting circuit provides a first output signal responsive to the propagating heat signals received by the first detector and a second detecting circuit provides a second output signal responsive to the propagating heat signals received by the downstream detector. A difference circuit subtracts the first and second signals to obtain a difference signal and an output circuit provides an output signal responsive to the difference signal, which reflects both magnitude and phase. The resulting output signal has improved resolution and provides for improved sensor sensitivity.

23 Claims, 8 Drawing Sheets

DIFFERENTIAL AC ANEMOMETER

This invention relates to mass air flow sensors and more particularly, to a mass air flow sensor which can be batch fabricated and which can provide a high resolution output signal. This invention is related to the subjects of U.S. Pat. Nos. 4,576,050; 4,713,970 and 4,782,708, and U.S. patent application, Ser. No. 07/637,724, filed Jan. 7, 1991, assigned to the assignee of this invention, all incorporated herein by reference.

BACKGROUND OF THE INVENTION

With stringent emissions requirements on automobiles, precise control of the air/fuel ratio delivery to the vehicle engine, which affects vehicle emissions, is required. To obtain the required precise control of air/fuel ratio delivered to the engine, air flow to the engine is typically measured and the fuel is scheduled based on the amount of air flowing into the engine. The resulting air/fuel ratio into the engine is optimized to thereby provide cleaner engine exhaust.

Typically, mass air flow into the engine is measured with a mass air flow sensor comprising an assembly of discrete components. As high performance of the mass air flow sensors is desired, ideal requirements for mass air flow sensors include fast response, environmental insensitivity, operation over a large air flow range and the ability to detect bi-directional flow. What is desired is a mass air flow sensor that obtains all of these advantages without the required cost of assembling discrete components.

SUMMARY OF THE INVENTION

This invention provides a mass air flow sensor capable of sensing air flow rates over a wide range, including a typical vehicle operating range of 2 grams per second to 140 grams per second. The mass air flow sensor of this invention is environmentally insensitive, practical and easily manufactured. The measurement accomplished by this invention is fast, accurate and indicative of bi-directional flow. In addition, the apparatus of this invention can be batch micro-fabricated to thereby greatly reduce manufacturing costs and increase product yield.

This invention operates on the principle that the propagation of heat waves in an air flow duct varies with respect to the air flow through that duct. This invention exhibits more flow sensitivity than previous heat propagation measurement apparatus by providing an output signal which can be measured more precisely and implemented with greater simplicity. Increased sensitivity to the mass air flow is obtained using an upstream detector and a downstream detector vertically placed at an equal distance from a thermal heater. The thermal heater is heated with a sinusoidal waveform to provide thermal oscillations which propagate to both the upstream and the downstream detectors. Both the magnitude and the phase of the thermal oscillations detected upstream and downstream of the heater change rapidly with increasing mass air flow. The difference amplitude rate of change with respect to flow between the downstream detector signal and the upstream detector signal defines the flow sensitivity of the sensor. The output signal is the magnitude of the difference amplitude signal and is a voltage.

Structurally, the apparatus of this invention comprises a sensor with a heater, an upstream detector and a downstream detector. An excitation means provides an AC signal to the heater thereby causing the heater to generate propagating oscillatory heat waves. A first means detects an upstream signal from the upstream detector responsive to the propagating heat waves. A second means detects a downstream signal from the downstream detector responsive to the propagating heat waves. A difference means subtracts the upstream signal from the downstream signal to obtain a difference signal and an output means provides an output signal responsive to the difference signal.

DETAILED DESCRIPTION OF THE INVENTION

Figure 1:
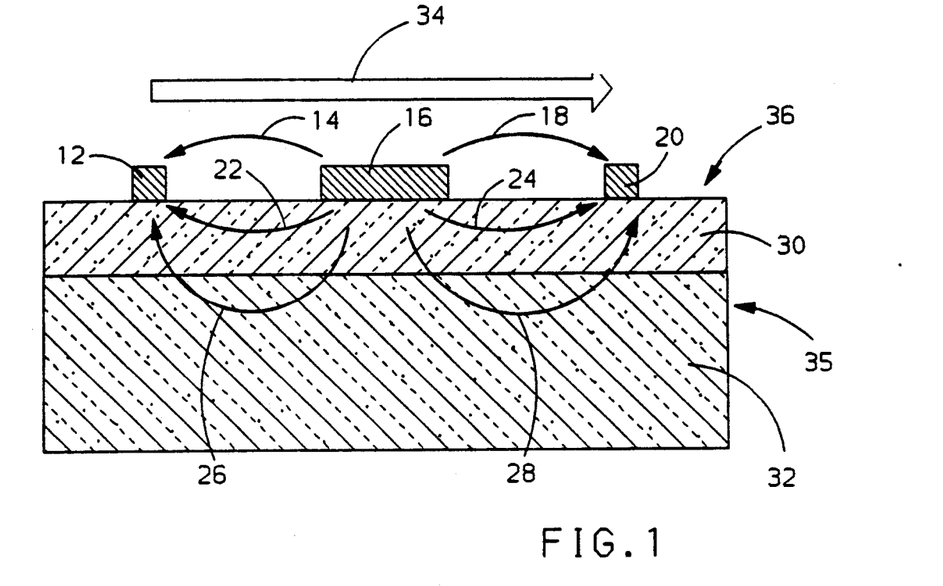
FIG. 1 is an illustration of the sensor used with this invention.

Referring to FIG. 1, example sensor 36 for use with this invention includes heating element 16, upstream detector 12 and downstream detector 20 fabricated onto substrate 35. Substrate 35 comprises polyimide layer 30 and silicon layer 32. Arrow 34 illustrates the positive direction of air flow past the sensor. The upstream detector 12 and downstream detector 20 are preferably thermistors although thermocouples may be used.

When a sinusoidal voltage is applied to heating element 16, oscillatory heat waves propagate outward from heating element 16 to the upstream and downstream detectors 12 and 20. The propagation of heat waves, illustrated by arrows 14, 18, 22, 24, 26 and 28, is affected by the direction and the amount of mass air flow past the sensor 36. The propagation of heat waves illustrated by arrows 14 and 18 through the air is substantially affected by the air flow past the sensor 36. The propagation of heat waves, illustrated by arrows 22, 24, 26 and 28 through the substrate 35, including both the silicon and polyimide layers 32 and 30, is not substantially affected by the air flow past the sensor 36.

To illustrate the operational advantages of this invention, let D represent the downstream heat signal received by downstream detector 20 and let U represent the upstream signal received by upstream detector 12. D and U may be represented by equations (1) and (2):

$$D = D_a + D_s = d_a \cos(\omega t - \phi) + d_s \cos(\omega t - \gamma), \text{ and} \quad (1)$$

$$U = U_a + U_s = u_a \cos(\omega t - \theta) + u_s \cos(\omega t - \delta), \quad (2)$$

where $\omega$ is twice the heater excitation angular frequency, $d_a$ is the magnitude of the downstream signal through the air, $d_s$ is the magnitude of the downstream signal through the substrate, $u_a$ is the magnitude of the upstream signal through the air, $u_s$ is the magnitude of the upstream signal through the substrate, $D_a$ and $D_s$ are the downstream air and substrate signals, $U_a$ and $U_s$ are the upstream air and substrate signals, and where the angles $\phi$, $\gamma$, $\theta$ and $\delta$ represent the phase difference in the signals due to the air flow past the sensor 36.

If the sensor 36 is constructed symmetrically as is preferred, in a zero air flow condition, the upstream and downstream signals D and U are substantially equal. When air flow occurs past the sensor 36 in the direction of arrow 34, the first signal U is reduced by the air flow, while the second signal D is increased. Conversely, when air flow past the sensor 36 occurs in the direction opposite arrow 34, the first signal U is increased while the second signal D is decreased. Since the components of the signals through the substrate 35 are not substantially affected by the air flow, it is the components of the signals through the air that are affected. Thus, the upstream and downstream substrate signals remain substantially equal during changing air flow conditions. As a result, the substrate component of the signal can be virtually eliminated by subtracting equation (1) from equation (2), as illustrated in equation (3):

$$D - U \approx D_a - U_a = d_a\cos(\omega t - \phi) - u_a\cos(\omega t - \theta). \quad (3)$$

The resulting difference signal is substantially independent of the substrate signals.

The advantages of obtaining a difference signal such as illustrated in equation (3) include elimination of environmental effects on substrate 35. Such environmental effects include ambient temperature, relative humidity, polyimide thickness and chemical composition.

Figure 2:
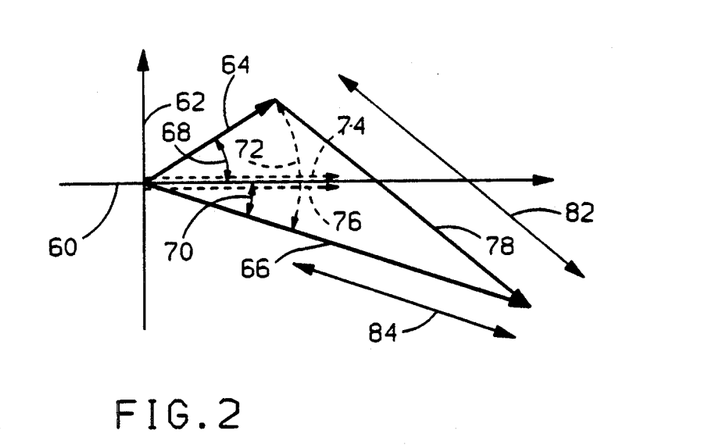
FIGS. 2 and 3 are illustrations showing the operational advantages of this invention.

FIG. 2 illustrates the improved sensitivity that can be achieved by using a difference signal as obtained by equation (3) instead of a magnitude-alone or phase-alone signal. Referring to FIG. 2, vectors 74 and 76 illustrate the upstream and downstream signal vectors in the absence of air flow past the sensor 36 where both signals are equal. In the presence of air flow, the upstream signal has a magnitude decrease and a phase increase due to propagation time increase of the air component of the heat signal. The upstream signal is illustrated by vector 64 and its phase is illustrated by angle 68. Conversely, the downstream signal has its magnitude increased and its phase decreased due to propagation time decrease of the air component of the heat signal. The downstream signal is illustrated by vector 66 and its phase is illustrated by angle 70. Curve 72 represents the phase difference between the air flow signals and line 84 represents the magnitude difference between the air flow signals. Vector 78 illustrates the vector difference between the two signals and its magnitude 82 reflects both the magnitude and phase difference between the two signals.

It may be shown that the magnitude of vector 78 is given by equation 4:

$$|D - U| = sqrt\{(d-u)^2 + 2du[1 - \cos(\theta + \phi)]\}. \quad (4)$$

where d and u represent the magnitudes of D and U, respectively. In the case of low air flow past the sensor 36, the following assumptions may be made:

$$u(Q \approx 0) \approx A(1 - aQ), \quad aQ << 1, \quad (5)$$

$$d(Q \approx 0) \approx A(1 + aQ), \quad (6)$$

$$\theta(Q \approx 0) = \alpha Q, \quad \alpha Q << \pi/2, \text{ and} \quad (7)$$

$$\phi(Q \approx 0) \approx \alpha Q, \quad (8)$$

where A is an amplitude term and the first terms of a Taylor series expansion, a and $\alpha$, are related to the magnitude and phase sensitivities to flow, respectively. It can then be shown that the magnitude of vector 78 in the low air flow condition, can be represented by equation (9):

$$|D - U| \approx 2AQ sqrt\{a^2 + \alpha^2\}. \quad (9)$$

Figure 3:
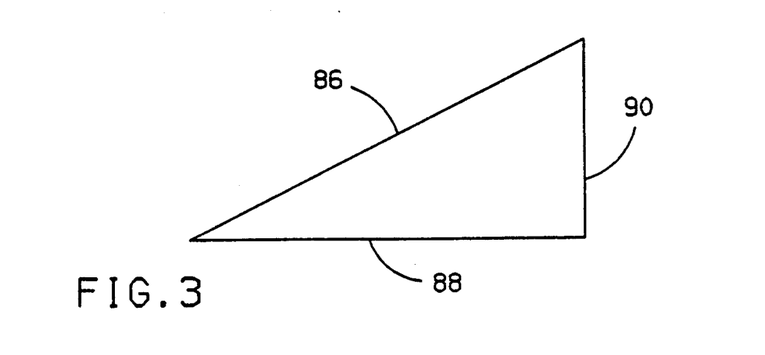

Referring to FIG. 3, the side 88 of the shown triangle illustrates the sensitivity of the sensor if the magnitudes of the propagation signals only are considered while side 90 illustrates the sensitivity of the sensor if the phase difference of the signals is only considered. Side 86, the longest side of the triangle, illustrates increased sensitivity of the sensor when both the magnitude and phase of the heat signals are considered according to the apparatus of this invention.

Figure 4:
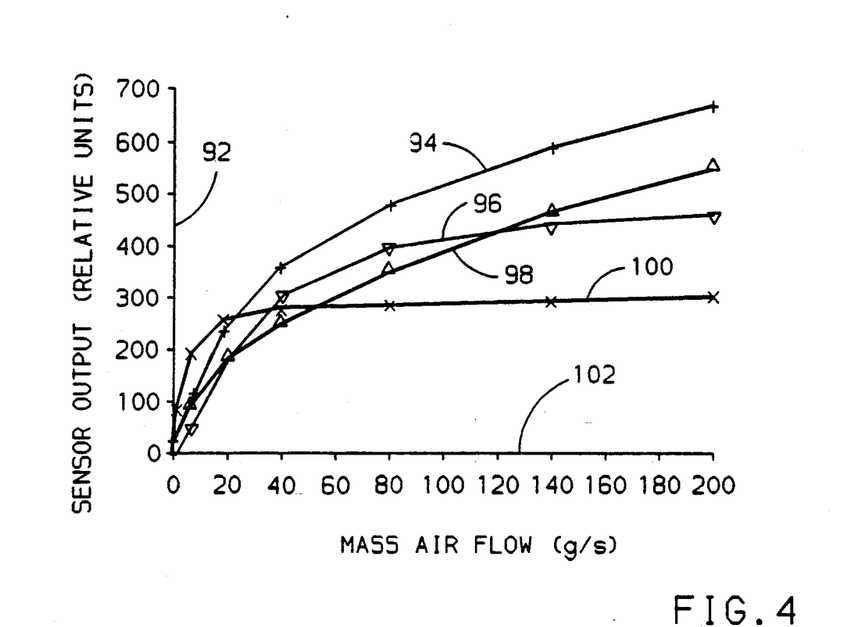
FIG. 4 is a graph showing the improved performance results of this invention.

FIG. 4 is a graph of experimental results showing the superior performance of this invention. Axis 102 represents mass air flow past the sensor and axis 92 represents the sensor output in relative units. Trace 94 represents sensor output obtained by subtracting the upstream signal from the downstream signal according to equation (4). Traces 96 and 98 illustrate the sensor output when only the differences in signal magnitudes or the differences in signal phases are considered, respectively. (Trace 96 illustrates the sensor range if the apparatus disclosed herein is connected in the circuit configuration shown in FIG. 6 of U.S. Pat. No., 4,576,050.) Trace 100 plots the phase of the amplitude difference which shows great sensitivity near 0, but later saturates. In the experimental mass air flow range of 0 to 200 grams per second, the graph illustrates that the sensor output according to this invention (trace 94) achieves a greater range in microvolts lending the sensor to greater sensitivity and accuracy.

To fabricate the sensor 36, silicon wafers may be prepared using a standard cleaning process, referred to as "RCA cleaning" and well known to those skilled in the art. Ten milliliters of polyimide, e.g., Dupont TM 2574D, are then dispensed at the center of the wafer, which is spun at 1,400 rpm for 120 seconds. The wafer is then heated to 70 degrees Celsius, 85 degrees Celsius, 135 degrees Celsius, 180 degrees Celsius and 300 degrees Celsius, each for about 30 minutes. The resulting thickness of the polyimide layer is about 7.96 micrometers with optical interference fringes visible only at the center and the edge of the wafer.

A second application of 15 milliliters of polyimide is then applied, spun and cured in the same manner to yield a final resulting thickness of 15.88 micrometers. The wafers are then metalized with a 0.18 micrometer thickness. Next the wafers are photolithographically patterned to define the platinum heater and detectors so that a sensor is fabricated every 1.1 square centimeter. The leads to the heater and detector are also patterned. The wafer is then diced into 1.1 square centimeter sensors using an automated wafer saw. The sensors can then be mounted such as onto flexible circuits comprising several layers of copper-clad polyimide film. Example measurements for the heater 16 is 1 millimeter in length and 50 micrometers wide. Example measurements for the thermistors are 850 micrometers in length and nine micrometers in width. An example measurement for the gap between the heater and the thermistor strips is 50 micrometers. The resulting thermal coefficient of resistivity of the thermistors is about 0.0025 per degree Celsius.

Figure 5:
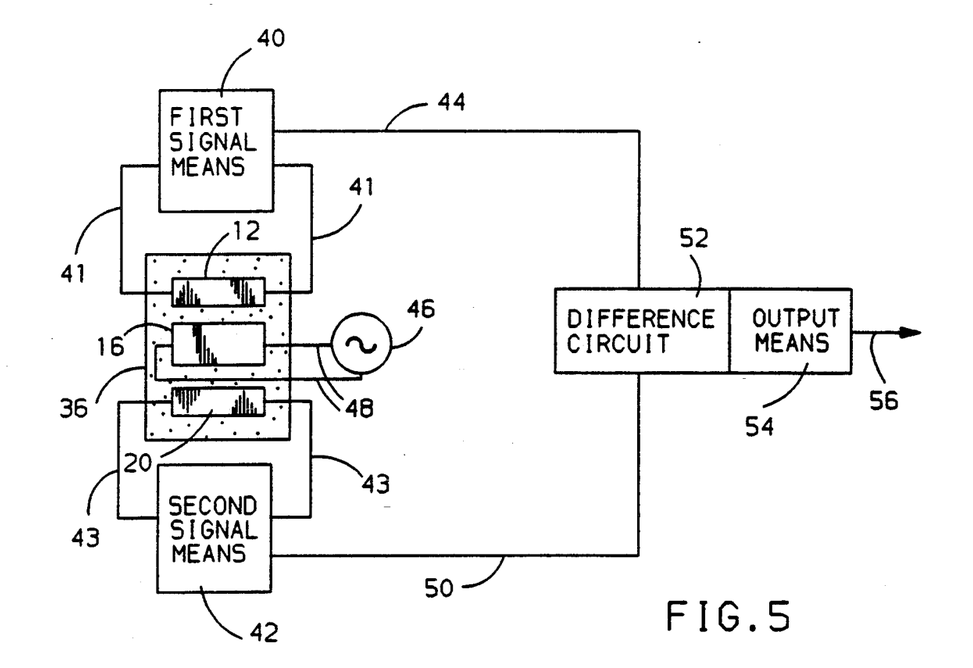
FIG. 5 is an illustration of the apparatus of this invention.

Referring to FIG. 5, the apparatus of this invention shown includes sensor 36 and means 46 for applying an oscillatory signal through lines 48 to heater 16 so that heater 16 generates propagating oscillatory heat waves. First signal means 40 coupled to the upstream detector 12 through lines 41 provides an output signal on line 44 indicative of the propagating heat signal received by detector 12. Second signal means 42 coupled to the downstream detector 20 through lines 43 provides an output signal on line 50 indicative of the propagating heat signal received by downstream detector 20. The signals on lines 44 and 50 include both the air component of the heat signal and the substrate component of the heat signal. The signals on lines 44 and 50 are coupled to means 52 for subtracting the two signals to obtain a difference signal. Means 54 provides an output signal on line 56 in response to the obtained difference signal. The output signal on line 56 is the anemometer output signal indicative of the measurement of airflow past the sensor 36 and may be used in any kind of control system or airflow measurement system known to those skilled in the art as an accurate measure of mass airflow past sensor 36.

The subtraction step at subtracting means 52 substantially eliminates the substrate component of the heat signals in lines 44 and 50 so that the resulting difference signal is indicative of the magnitude of the vector difference between the upstream and the downstream signals. This magnitude is illustrated in FIG. 2 by line 82 and FIG. 3 by line 86.

Figure 6:
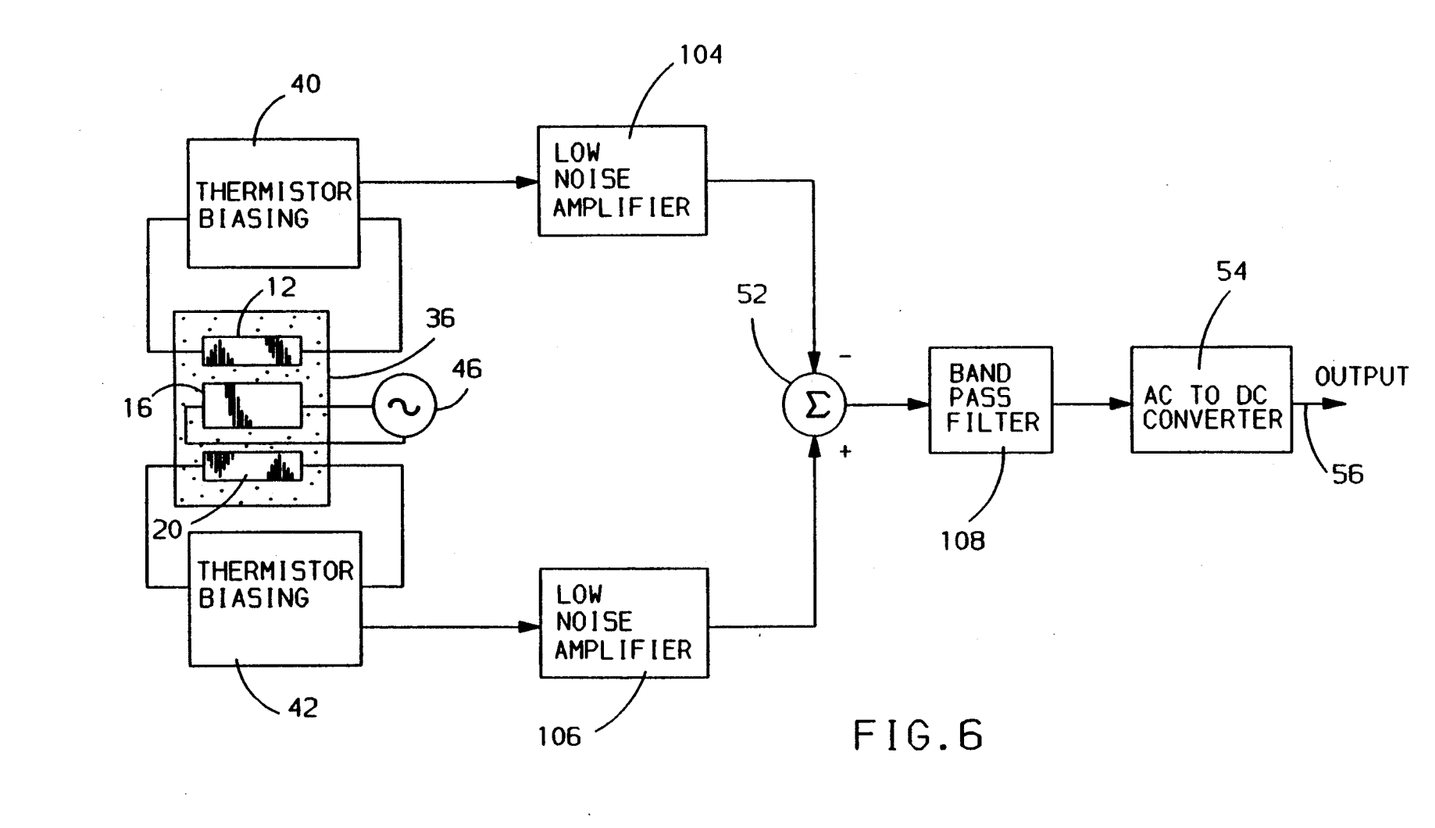
FIG. 6 is a schematic diagram of an implementation of this invention.

Referring to the implementation of this invention shown in FIG. 6, the first and second signal means 40 and 42 comprise thermistor biasing circuits. The outputs of the thermistor biasing circuits 40 and 42 carry the signals indicative of the heat signals received by detectors 12 and 20. The outputs of circuits 40 and 42 are amplified by low-noise amplifiers 104 and 106 and the difference is found by subtracting means 52 comprising a summing circuit. The resultant difference signal from summing circuit is filtered by band pass filter 108 tuned to twice the frequency of the heater excitation means 46, which is an AC signal source. The output of band-pass filter 108 is coupled to the output means, which here comprises an AC to DC converter circuit that provides a DC output signal on line 56 indicative of the amount of mass air flow past sensor 36.

Figure 7:
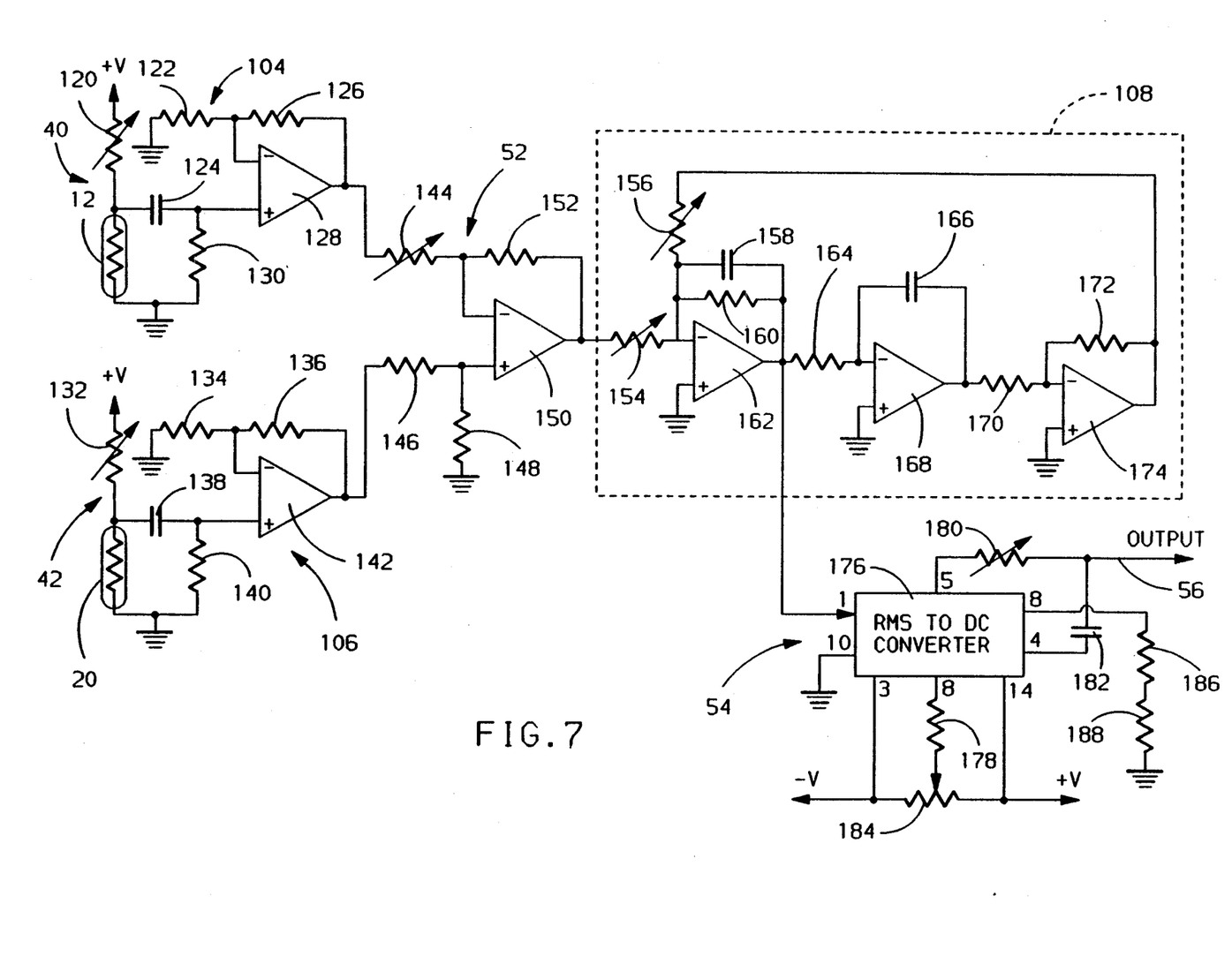
FIG. 7 is a circuit diagram of an implementation of this invention.

FIG. 7 is a detailed circuit diagram of the first and second signal means 40 and 42, amplifiers 104 and 106, subtracting means 52, band-pass filter 108 and output means 54. In the implementation shown, the upstream thermistor 12 is biased to a +V voltage source of 15 volts by resistor 120, which may be a laser trimmable resistor. In a similar manner, thermistor 20, the downstream detector, is biased to a +V voltage source of 15 volts by resistor 132 which may also be a laser trimmable resistor.

At the junction between thermistor 12 and resistor 120 is a signal varying in response to the current through thermistor 12, which is responsive to the heat propagation signals received by thermistor 12. This signal is coupled to amplifier 104 through a capacitor 124. Amplifier 104 includes operational amplifier 128 and resistors 122, 126 and 130 to provide low-noise, high-gain amplification of the signal output from biasing circuit 40. In a similar manner, the signal output from thermistor 20 is coupled to amplifier 106 by capacitor 138, where operational amplifier 142 together with resistors 134, 136 and 140 provide high-gain, low-noise amplification of the signal from circuit 42.

The amplified upstream and downstream signals are coupled to subtracting means 52 comprising operational amplifier 150 and resistors 148 and 152. The upstream signal is coupled to the inverting input of operational amplifier 150 via resistor 144 and the downstream signal is coupled to the non-inverting input of operational amplifier 150 via resistor 146.

The band-pass filter 108 shown is a bi-quad band-pass filter and comprises operational amplifiers 162, 168 and 174 that together with associated resistors 156, 160, 164, 170 and 172 and capacitors 158 and 166 filter the out-of-band noise signals that may be present in the signal output from subtracting means 52. The filter shown is just an example implementation of the filter 108 and any other suitable filter may be implemented.

The output of filter 108 is coupled to output signal means 54 which here is the standard 4341 RMS to DC converter implemented as shown with resistors 178, 180, 186 and 188, potentiometer 184 and capacitor 182. The resulting output signal on line 56 is a DC signal indicative of the mass air flow past sensor 36 and has the increased signal range and sensitivity provided by this invention.

The circuit shown in FIG. 7 does not provide a signal indicative of the direction of air flow past the sensor. To make use of the bi-directional characteristics of sensor 36, the circuit shown in FIG. 8 may be implemented.

Figure 8:
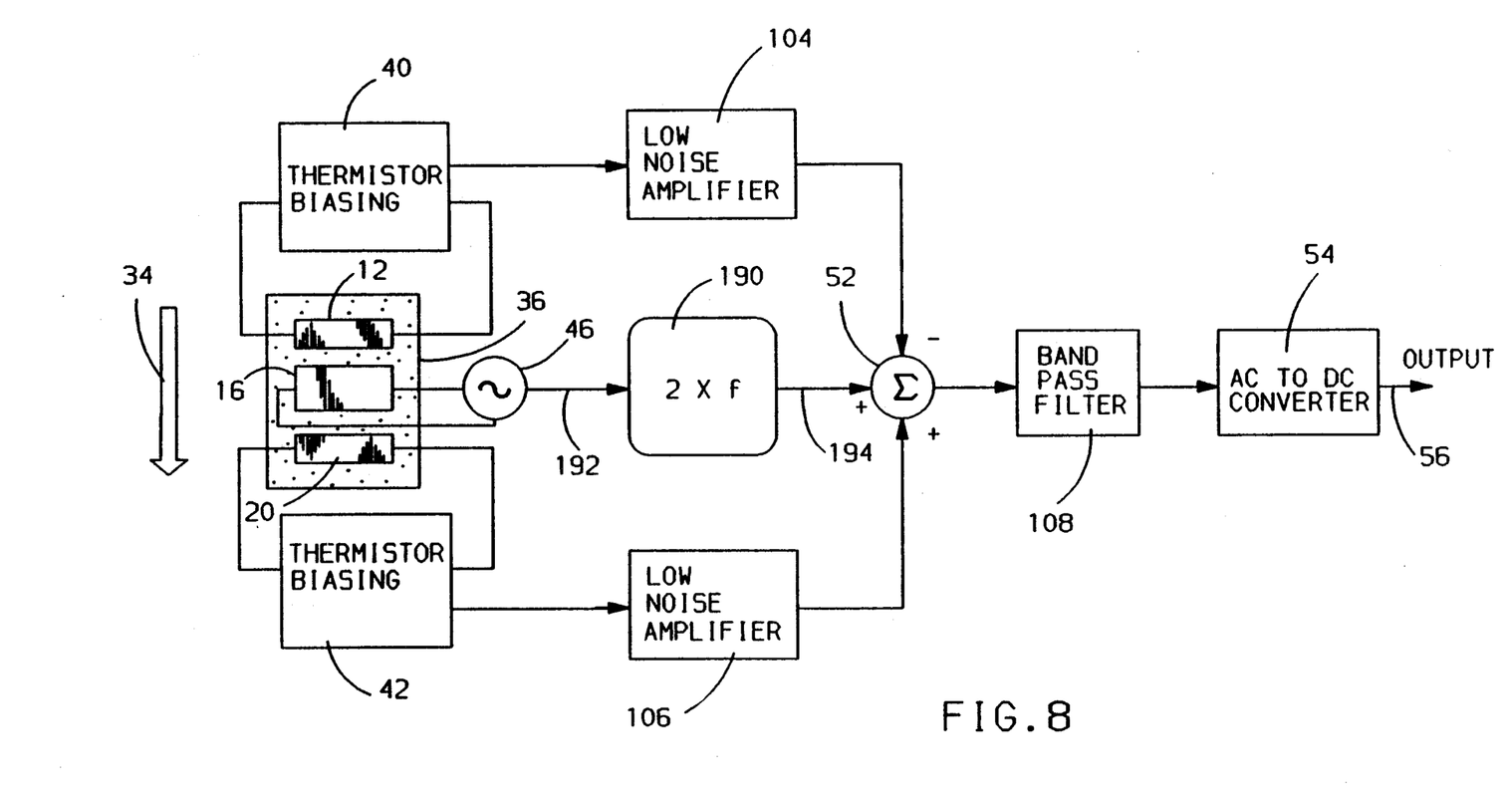
FIG. 8 is a diagram of another implementation of this invention.
Figure 9:
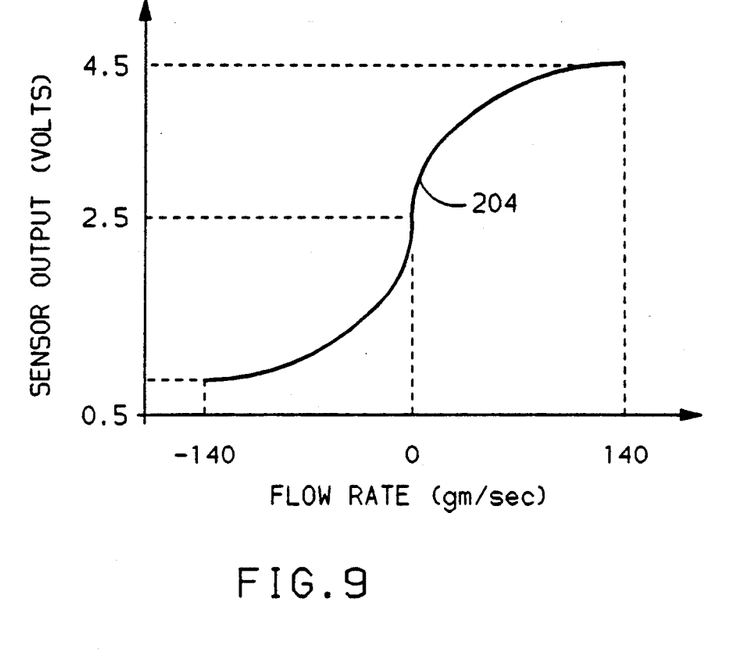
FIG. 9 is a graph relating bi-directional flow rate and sensor output.

In FIG. 8, a signal from the AC signal source 46 is provided on line 192 to frequency multiplier 190. Frequency multiplier 190 outputs a signal on line 194 having twice the frequency of the excitation signal for heater 16. This signal on line 194 is provided to subtracting means 52 to provide an offset to the difference signal. In this manner, when positive air flow in the direction of arrow 34 passes sensor 36, the output signal is a signal higher than the offset signal, and when air flow past sensor 36 is in the direction opposite arrow 34, the output signal is a signal less than the offset voltage. An example offset voltage may be 2.5 volts. The bi-directional performance of the circuit is illustrated in FIG. 9 where trace 204 indicates the output signal, which at 0 grams per second air flow rate is 2.5 volts, which increases to approximately 4.5 volts at 140 grams per second air flow and which decreases to approximately 0.5 volts at 140 grams per second air flow in the opposite direction.

Figure 10:
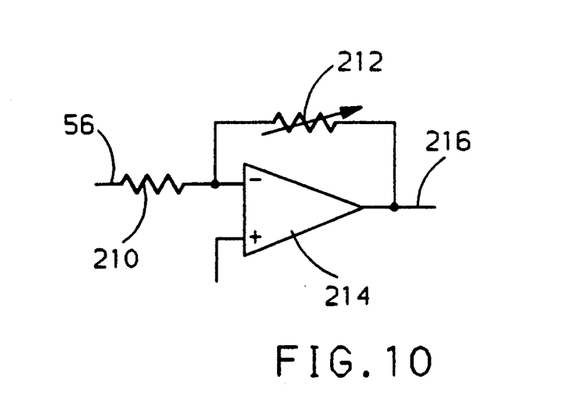
FIG. 10 illustrates a circuit for use with this invention.

The circuits described above may have an overall temperature dependence due to temperature effects on the heater 16, detectors 12 and 20, the sensor leads and the varying thermal propagation of air at varying temperatures. To linearly compensate for these temperature effects, a compensating circuit such as the circuit shown in FIG. 10 may be implemented. A low-gain amplifier with feedback thermistor 212, operational amplifier 214 and resistor 210 coupled to output line 56 provide a temperature compensated output on line 216. Any other temperature compensating circuitry suitable for canceling temperature coefficients may be used.

In the event of unevenness or asymmetry in the structure of sensor 36 or its components, subtraction of the output signals may fail to affect total cancellation of the substrate propagation signals. To compensate for this, an electronic "substrate offset" signal may be generated by a waveform generating circuit. The "substrate offset" signal may either be summed with the output signal provided by one of the detectors or may be summed with the difference signal to affect a more complete cancellation of the substrate propagation signal.

In the above implementations of this invention, the heat propagation signal for the substrate 35 is canceled electronically by subtracting the signals output from the first and second signal means. One hundred percent cancellation of the heat propagation signal through an electronic circuit may be very difficult to achieve. To aid in the cancellation of the heat propagation signal, mechanical reduction of the substrate propagation signal may be used.

Figure 11:
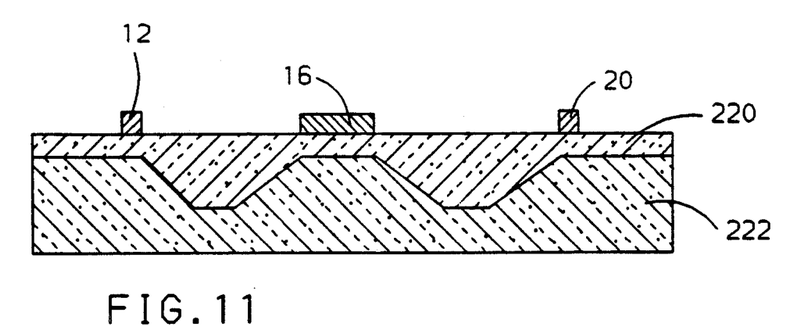
FIGS. 11-17 illustrate example alternative embodiments of a sensor for use with this invention.

Referring to FIG. 11, trenches are etched in silicon wafer 222 between the heater 16 and detectors 12 and 20. Since the silicon 222 is the primary transferor of the substrate heat signal, etching the trenches as shown in FIG. 11 may provide the mechanical stoppage to the thermal flow. The trenches may be filled with a polyimide layer 220, which is substantially less heat conductive than the silicon. Trenches 10 micrometers wide and 100 micrometers deep etched with potassium hydroxide are adequate.

Figure 12:
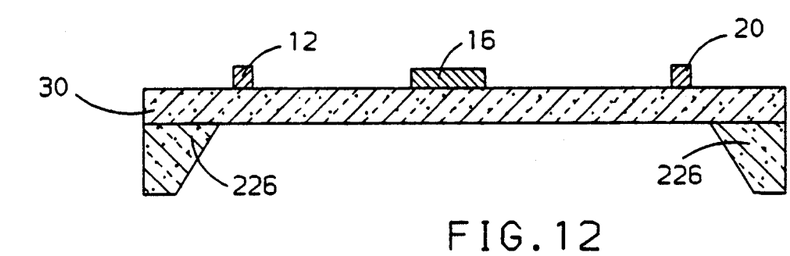
Figure 13:
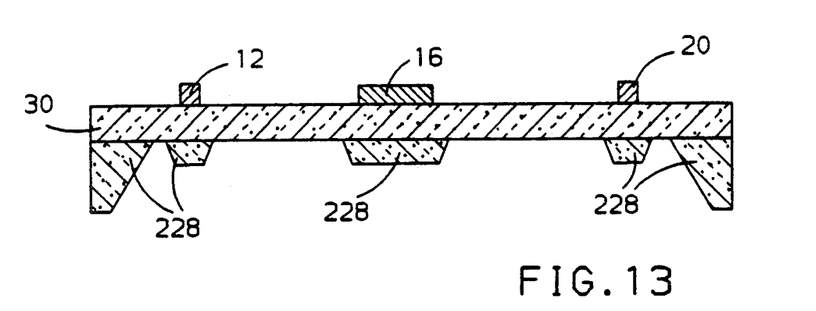
Figure 14:
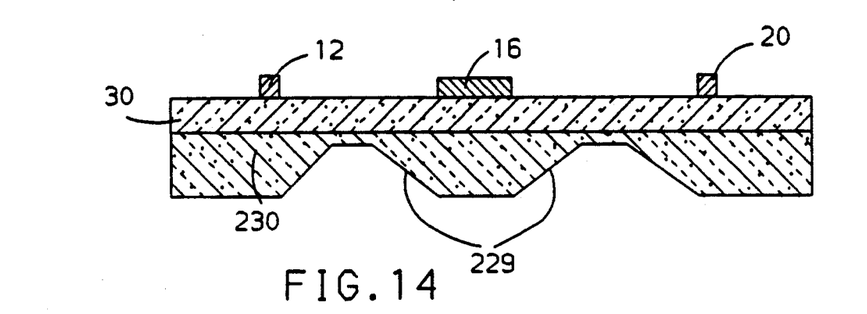

In the implementations shown in FIGS. 12 and 13, the polyimide layer 30 may be thickened to provide improved support and the silicon may be omitted in the areas between the heater 16 and detectors 12 and 20 to prevent heat propagation through silicon. A variation of this is shown in FIG. 14 where areas 229 of silicon between the heater 16 and detectors 12 and 20 are micro-machined away.

Figure 15:
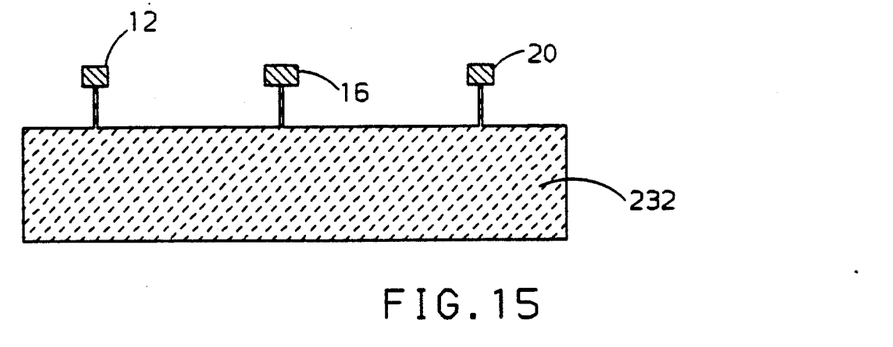

In the implementation shown in FIG. 15, the heater 16 and detectors 12 and 20 are provided on free-standing structures etched from block 232 comprising either silicon or alumina.

Figure 16:
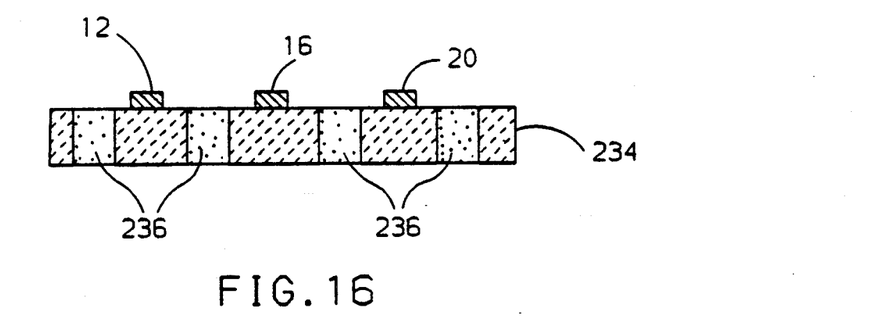
Figure 17:
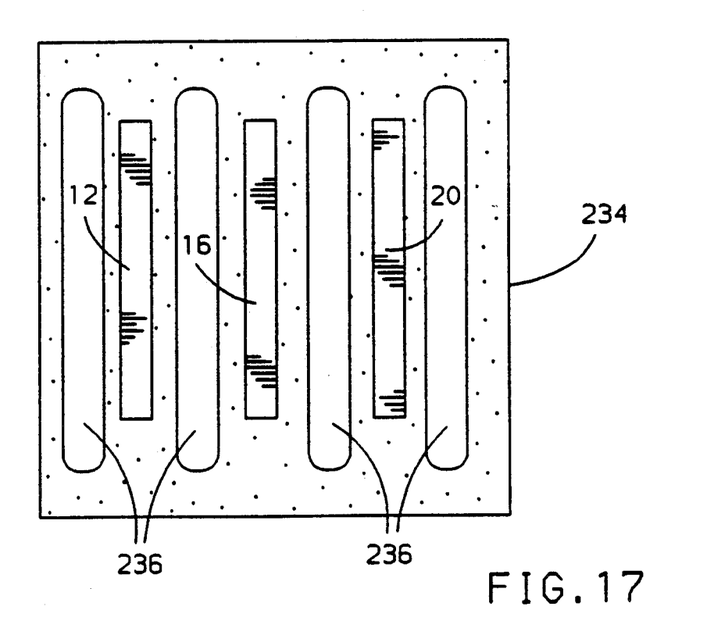

FIGS. 16 and 17 show two views of an implementation in which the heater 16 and detectors 12 and 20 are fabricated onto a block 234 comprising either silicon or alumina in which gaps 236 are micro-machined. The gaps 236 provide mechanical isolation of the propagating heat signal in the substrate block 234, virtually eliminating the presence of the substrate signal in the output signal from detectors 12 and 20.

The above described implementations of this invention provide a practical mass air flow sensor easy to manufacture, having increased sensitivity, reduced dependence on substrate parameters and requiring relatively non-complex electronic components that are easily built and calibrated. These advantages add up to a lower cost, higher performance device.

In conjunction with the apparatus of this invention, a method of this invention is provided comprising a first step of receiving the first and second output signals from the first and second detectors. In a second step, the first output signal is subtracted from the second output signal to obtain a difference signal. In a third step an output signal is provided responsive to the difference signal.

The above described implementations of this invention are example implementations and are not meant to be limiting on the scope of this invention. Moreover, various improvements and modifications to this invention may occur to those skilled in the art and will fall within the scope of this invention as defined below.

We claim:

1. An apparatus for providing an airflow output signal indicative of a measurement of airflow, comprising:
   a sensor including a heater, an upstream detector and a downstream detector;
   means for exciting the heater to generate propagating heat signals that are received by the upstream and downstream detectors;
   first signal means for providing a first output signal responsive to the propagating heat signals received by the first detector;
   second signal means providing a second output signal responsive to the propagating heat signals received by the downstream detector;
   means for subtracting the first and second signals to obtain a difference signal; and
   means for providing the airflow output signal responsive to the difference signal, the airflow output signal comprising a first component and a second component, the first component representative of a magnitude difference of the first and second output signals and the second component representative of a phase difference between the first and second output signals wherein the airflow output signal is indicative of a measure of mass airflow past the sensor, thereby providing increased sensor sensitivity.

2. The apparatus set forth in claim 1 wherein the first and second detectors are thermistors.

3. The apparatus as set forth in claim 1 wherein the first and second detectors are thermocouples.

4. The apparatus set forth in claim 1 wherein the heater and the first and second detectors are fabricated onto a substrate.

5. The apparatus set forth in claim 4 wherein the substrate comprises a layer of silicon and layer of polyimide.

6. The apparatus set forth in claim 4 wherein the substrate comprises polyimide.

7. The apparatus set forth in claim 4 wherein the substrate comprises silicon.

8. The apparatus set forth in claim 4 wherein the substrate comprises alumina.

9. The apparatus set forth in claim 5 wherein at least some of the silicon between the heater and the detectors is removed.

10. The apparatus set forth in claim 4 wherein the heater and first and second detectors are micro-machined into free-standing structures.

11. The apparatus set forth in claim 4 wherein gaps in the substrate are micro-machined between the heater and the first and second detectors.

12. The apparatus set forth in claim 1 also comprising first and second amplifiers for amplifying the first and second output signals.

13. The apparatus set forth in claim 1 also comprising a band-pass filter for filtering the signal output from the difference circuit.

14. An apparatus for providing an airflow output signal indicative of a measurement of airflow, comprising:
    a sensor including a heater, an upstream detector and a downstream detector;
    means for exciting the heater to generate propagating heat signals that are received by the upstream and downstream detectors;

first signal means for providing a first output signal responsive to the propagating heat signals received by the first detector;

second signal means providing a second output signal responsive to the propagating heat signals received by the downstream detector;

means for subtracting the first and second signals to obtain a difference signal; and means for providing the airflow output signal responsive to the difference signal, the airflow output signal comprising a first component and a second component, the first component representative of a magnitude difference of the first and second output signals and the second component representative of a phase difference between the first and second output signals wherein the airflow output signal is indicative of a measure of mass airflow past the sensor, thereby providing increased sensor sensitivity wherein the apparatus also comprises means for providing an offset signal to the output signal so that the output signal indicates bi-directional flow.

15. The apparatus as set forth in claim 1 wherein the exciting means excites the heater with an AC signal.

16. The apparatus as set forth in claim 1, wherein the output signal is indicative of a direction of air flow past the sensor.

17. The apparatus set forth in claim 1, also comprising:
a substrate upon which the heater, upstream detector and downstream detector are mounted, wherein
the substrate is constructed to mechanically reduce the substrate signal component reaching the first and second detectors.

18. The apparatus as set forth in claim 17, wherein the substrate comprises:
a layer of polyimide; and
a layer of silicon, wherein
the layer of polyimide is applied to the layer of silicon and the heater, upstream detector and downstream detector are applied on the layer of polyimide and wherein the substrate mechanically reduces the substrate signal component with trenches micro-machined into the silicon layer.

19. The apparatus as set forth in claim 17, wherein the substrate comprises:
a layer of polyimide; and
a layer of silicon, wherein
the layer of polyimide is applied to the layer of silicon and the heater, upstream detector and downstream detector are applied on the layer of polyimide and wherein the substrate mechanically reduces the substrate signal component with areas between the heater and the upstream and downstream detectors from which silicon is removed.

20. The apparatus set forth in claim 17, wherein the substrate mechanically reduces the substrate signal component with gaps micro-machined between the heater and the upstream and downstream detectors.

21. The apparatus set forth in claim 17, wherein the substrate comprises at least one member of a set comprising: alumina, polyimide and silicon.

22. A sensing device comprising:
a heater;
a first detector mounted upstream of the heater;
a second detector mounted downstream of the heater;
a substrate upon which the heater, first detector and second detector are mounted, wherein
the heater comprises means for generating propagatory heat signals, each propagatory heat signal comprising an air signal component and a substrate signal component and wherein the propagatory heat signals are received by the first and second detectors, and also comprising
a circuit coupled to the first and second detectors providing first and second output signals responsive to the propagatory heat signals received by the first and second detectors, the circuit subtracting the first and second output signals to substantially eliminate any effect of the substrate signal component, and the circuit providing a sensor output signal responsive to the subtraction of the first and second output signals, the sensor output signal comprising a first component and a second component, the first component representative of a magnitude difference of the first and second output signals and the second component representative of a phase difference between the first and second output signals.

23. An apparatus for providing an airflow output signal indicative of a measurement of airflow, comprising:
a sensor including a heater, an upstream detector and a downstream detector;
means for exciting the heater to generate propagating heat signals that are received by the upstream and downstream detectors;
first signal means for providing a first output signal responsive to the propagating heat signals received by the first detector;
second signal means providing a second output signal responsive to the propagating heat signals received by the downstream detector;
means for subtracting the first and second signals to obtain a difference signal; and
circuit means for converting ht difference signal to a DC signal, the DC signal comprising the airflow output signal, the difference signal comprising a first component and a second component, the first component representative of a magnitude difference of the first and second signals and the second component representative of a phase difference between the first and second signals, wherein the airflow output signal is indicative of a measure of mass airflow past the sensor, thereby providing increased sensor sensitivity.

* * * * *